US012353160B2

(12) United States Patent
Watanabe et al.

(10) Patent No.: US 12,353,160 B2
(45) Date of Patent: Jul. 8, 2025

(54) RECORDING DEVICE

(71) Applicant: SEIKO EPSON CORPORATION, Tokyo (JP)

(72) Inventors: Yuta Watanabe, Matsumoto (JP); Ryuji Moriyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/447,169

(22) Filed: Aug. 9, 2023

(65) Prior Publication Data

US 2024/0053703 A1 Feb. 15, 2024

(30) Foreign Application Priority Data

Aug. 10, 2022 (JP) ................................ 2022-127894

(51) Int. Cl.
*G03G 15/00* (2006.01)
*G03G 21/16* (2006.01)

(52) U.S. Cl.
CPC ................................ *G03G 21/1633* (2013.01)

(58) Field of Classification Search
CPC .......... B41J 29/02; B41J 29/13; B41J 2/1752; B41J 13/103
USPC .......................... 399/107; 347/108, 110, 197
See application file for complete search history.

(56) References Cited

U.S. PATENT DOCUMENTS 10,166,798 B2 * 1/2019 Hayashi .................. B41J 29/13

FOREIGN PATENT DOCUMENTS

JP 2022-042650 A 3/2022

* cited by examiner

*Primary Examiner* — Hoan H Tran
(74) *Attorney, Agent, or Firm* — WORKMAN NYDEGGER

(57) ABSTRACT

A recording device includes a medium support unit supporting a medium, a recording head performing recording on the medium supported by the medium support unit, and a housing accommodating the medium support unit and the recording head. The housing includes a cover being openable and closable and configured to open a front surface of the housing. A work surface is provided between the front surface and the medium support unit, and the medium support unit and the work surface are exposed when the cover is open.

14 Claims, 7 Drawing Sheets

RECORDING DEVICE

The present application is based on, and claims priority from JP Application Serial Number 2022-127894, filed Aug. 10, 2022, the disclosure of which is hereby incorporated by reference herein in its entirety.

BACKGROUND

1. Technical Field

The present disclosure relates to a recording device.

2. Related Art

In the related art, a recording device is known that includes a device discharging ink and a support portion on which a recording medium can be placed. For example, JP-A-2022-42650 discloses a printer provided with a front cover, an ejecting device, and a table on which a recording medium is placed. In the printer disclosed in JP-A-2022-42650, the upper surface of the table is exposed by opening the front cover, and the recording medium can be placed or replaced on the upper surface of the table.

As disclosed in JP-A-2022-42650, in the recording device requiring a user to set or replace the medium, workability becomes a problem. For example, when the recording device is a large-sized device, when the medium is large, when a jig for supporting the medium is large, or when a heavy jig is used, the work load of the user is great. For this reason, it has been desired to improve the workability of the operation relating to the setting and replacement of the medium.

SUMMARY

A first aspect for solving the above-described problem is a recording device including a medium support unit configured to support a medium, a recording unit configured to perform recording on the medium supported by the medium support unit, and a housing configured to accommodate the medium support unit and the recording unit. The housing includes a cover being openable and closable and configured to open a first surface of the housing. A work surface is provided between the first surface and the medium support unit, and the medium support unit and the work surface are exposed when the cover is open.

DESCRIPTION OF EMBODIMENTS

1. Configuration of Recording Device

Figure 1:
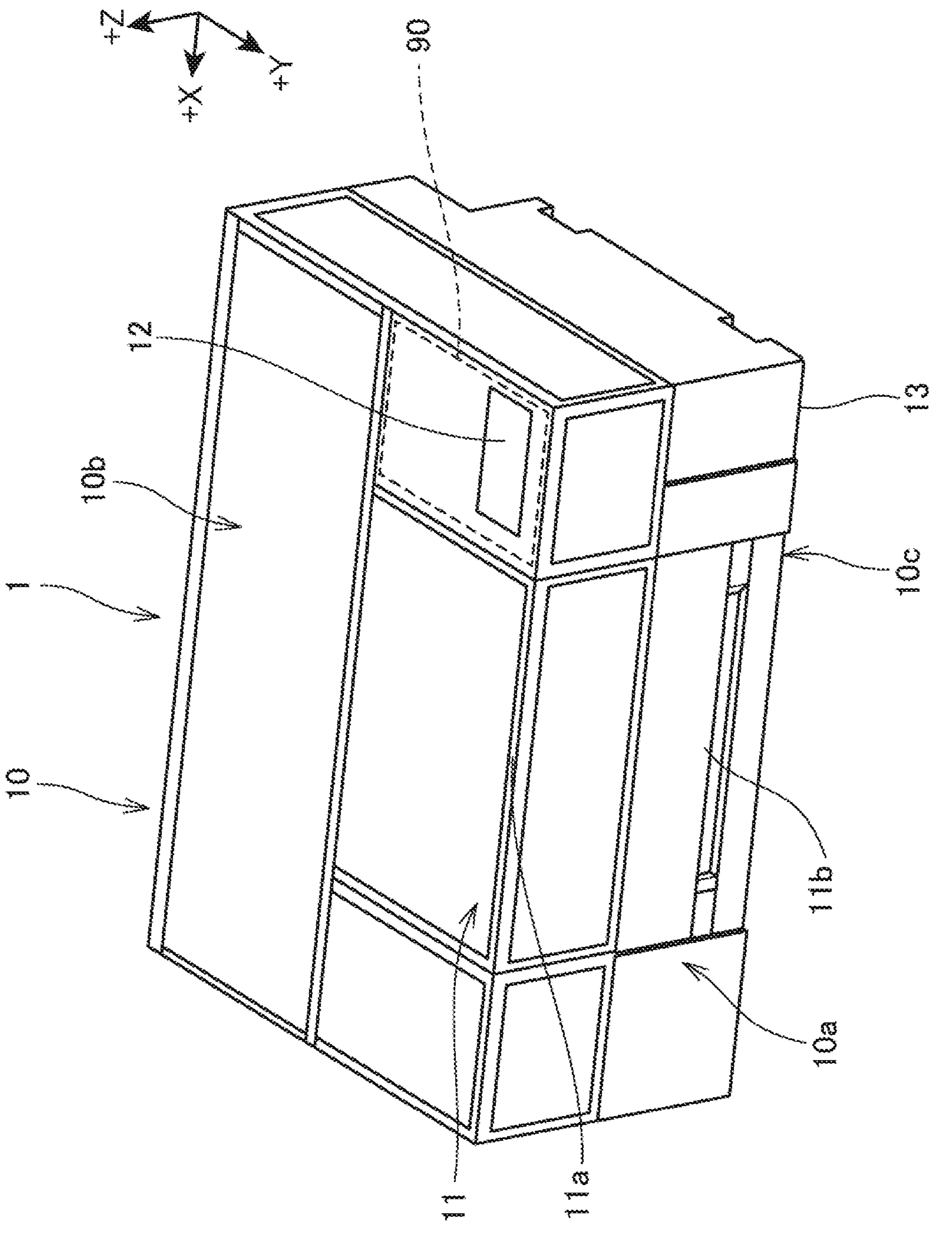
FIG. 1 is a perspective view of a recording device 1 according to an embodiment.
Figure 2:
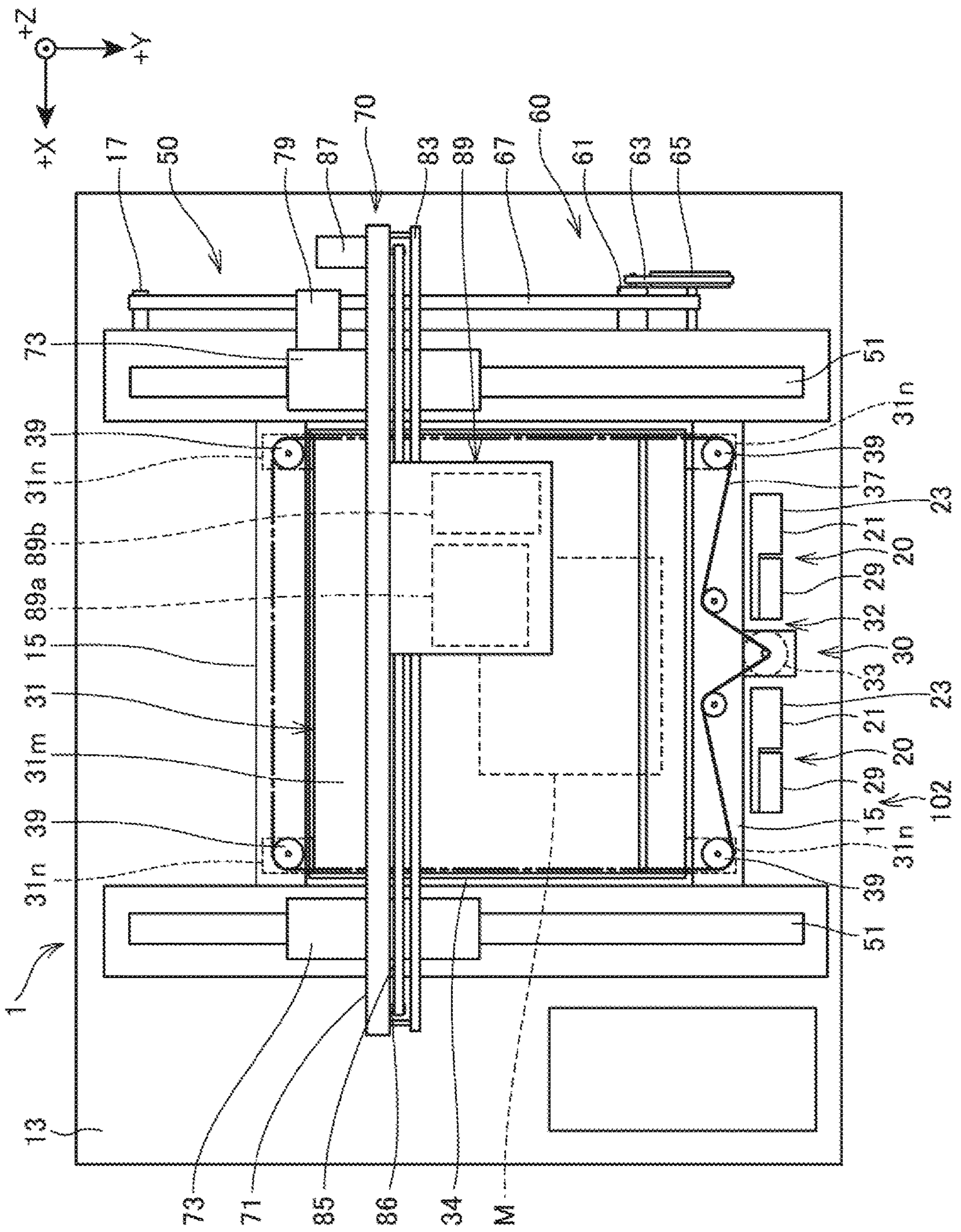
FIG. 2 is a plan view of the recording device.
Figure 3:
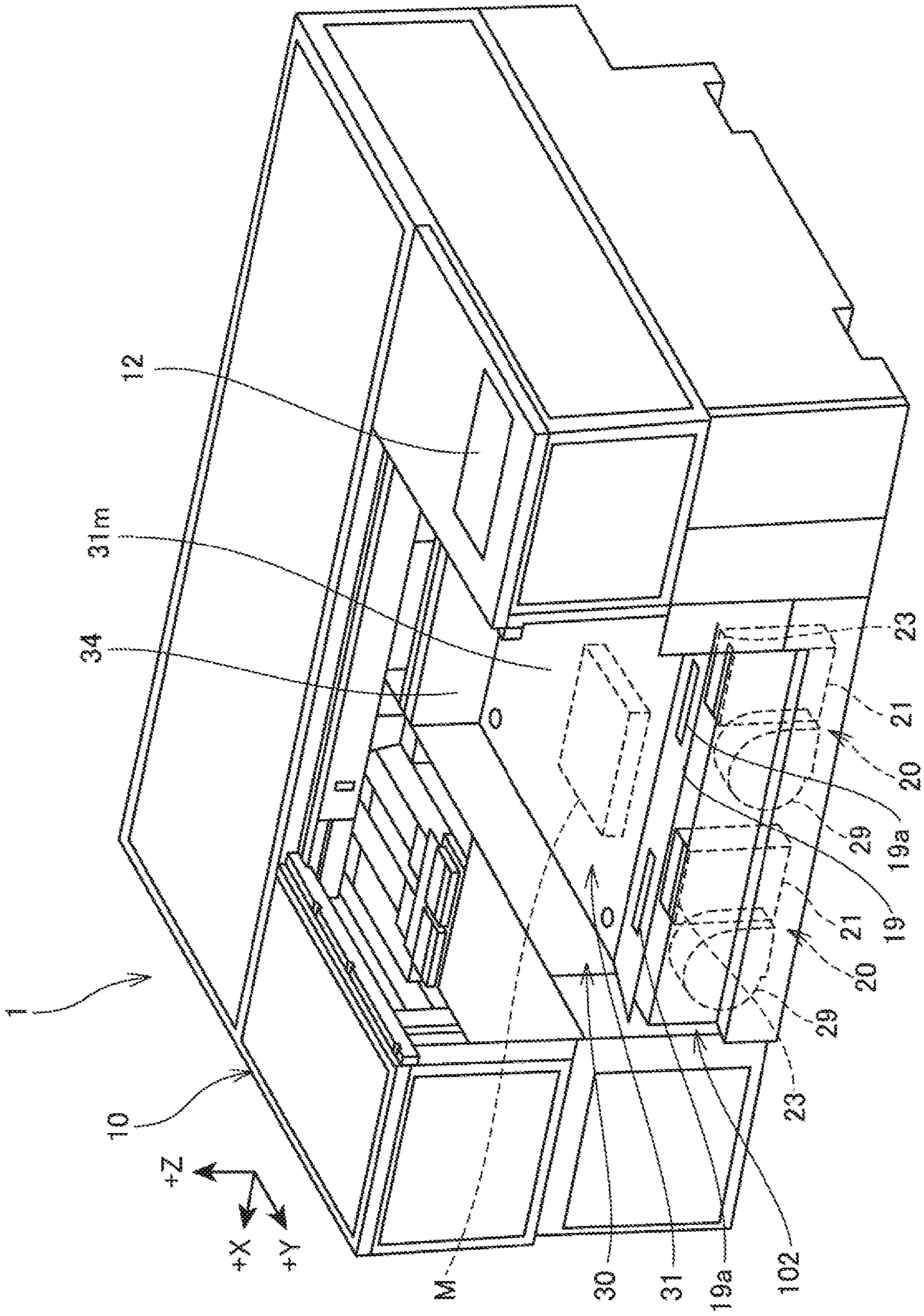
FIG. 3 is a perspective view of the recording device.

FIG. 1 is a perspective view of a recording device 1 according to an embodiment. FIG. 2 is a plan view of the recording device 1 and schematically illustrates an internal structure of the recording device 1. FIG. 3 is a perspective view of the recording device 1, and illustrates a state in which a cover 11 is removed for the purpose of description. The configuration of the recording device 1 will be described with reference to these drawings.

The recording device 1 is a device that performs recording on a medium M supported by a medium support unit 30, by discharging a liquid from a recording head 89*a*. The medium M is a sheet, a cloth, or a three-dimensional object. The sheet may be a sheet made of paper or synthetic resin. The cloth may be any of a non-woven cloth, a knitted material, and a fabric. The three-dimensional object includes ornaments such as clothes or shoes, daily necessities, mechanical components, and other various objects. A type of the liquid ejected onto the medium M by the recording device 1 is not limited, as long as the liquid has fluidity. For example, the recording device 1 is a printer that forms an image on the medium M by discharging ink of one or a plurality of colors toward the medium M using the recording head 89*a*. In this case, the medium M corresponds to a printing medium.

In FIG. 1, an X-axis, a Y-axis, and a Z-axis are illustrated. The X-axis, the Y-axis, and the Z-axis are orthogonal to one another. The Z-axis is an axis extending in the up-down direction, and can also be referred to as an axis extending in the vertical direction. The X-axis and the Y-axis are parallel to a horizontal plane. In the following description, a direction along the X-axis is referred to as a left-right direction, and a direction along the Y-axis is referred to as a front-rear direction. Specifically, a positive direction along the Z-axis is an upward direction, a positive direction along the X-axis is a rightward direction, and a positive direction along the Y-axis is a forward direction. The left-right direction corresponds to an example of a direction of "a width of a work surface". The Z-axis and the vertical direction correspond to an example of a "height direction".

The recording device 1 is provided with a housing 10. The housing 10 is a substantially cuboid box, and forms a closed space therein. The housing 10 covers the medium support unit 30, the recording head 89*a*, an irradiation unit 89*b*, a deodorizing unit 20, and the like, and accommodates these components in the closed space. The housing 10 is provided with a cover 11 along a front surface 10*a* and an upper surface 10*b*. The cover 11 is provided with a cover body 11*a* extending along the front surface 10*a* and the upper surface 10*b*, and a handle 11*b* coupled to a lower end of the cover body 11*a*. At the rear end of the cover body 11*a*, the cover 11 is coupled to the upper surface 10*b* of the housing 10 by a hinge (not illustrated) so as to be rotatable about an axis in the left-right direction. Thus, the cover 11 can be opened and closed from the front, by moving the handle 11*b* in the vertical direction. In addition, a bottom surface 10*c* of the housing 10 is provided with a bottom plate 13, which is a plate facing an installation surface of the housing 10. The installation surface is a surface on which the housing 10 is installed, such as a top surface of a desk (not illustrated). The front surface 10*a* corresponds to an example of a "first surface".

The recording device 1 is provided with a display unit 12 disposed at a front portion of the upper surface 10*b*. The display unit 12 is constituted by a liquid crystal panel and an LED, for example. Under the control of a control unit 90, the display unit 12 displays information, such as a progress status of recording by the recording device 1, a remaining amount of liquid to be ejected at the time of recording, a replacement time of consumables in the deodorizing unit 20 to be described later, and the like.

As illustrated in FIG. 2, the recording device 1 is provided with a pair of base members 15, a pair of guide shafts 51, the deodorizing unit 20, the medium support unit 30, a driving mechanism 50, and a moving unit 70. The base member 15 is a member extending in the left-right direction. The two base members 15 are arranged side by side in the front-rear direction on the bottom plate 13, and are fixed to the bottom plate 13. The guide shaft 51 is a shaft extending in the front-rear direction, and the two guide shafts 51 are respectively arranged side by side in the left-right direction so as to straddle the two base members 15. The deodorizing unit 20 sucks up air inside the housing 10, deodorizes the sucked air, and discharges the air to the outside of the housing 10. The deodorizing unit 20 will be described in detail later.

The medium support unit 30 supports the medium M, which is a recording target in the recording device 1. As illustrated in FIG. 2 and FIG. 3, the medium support unit 30 is provided with a table 31, a fall prevention plate 34, and a height movement mechanism 32. The table 31 is disposed at a position surrounded by the pair of base members 15 and the pair of guide shafts 51 in plan view. The table 31 includes a support surface 31*m*, which is a rectangular surface extending along the X-axis and the Y-axis and facing upward.

The support surface 31*m* is a surface on which the medium M is placed in the medium support unit 30, and is preferably a flat surface. The medium M or a jig that supports the medium M, as described below, is placed on the support surface 31*m*. The support surface 31*m* directly or indirectly supports the medium M.

As illustrated in FIG. 3, in a state in which the cover 11 is open, the support surface 31*m* is exposed to the front side and the upper side of the housing 10. In the state in which the cover 11 is open, from the front of the support surface 31*m*, a user operating the recording device 1 can perform an operation of setting the medium M on the support surface 31*m* and an operation of removing the medium M placed on the support surface 31*m* to the outside of the housing 10.

The table 31 is provided with protruding portions 31*n* protruding outward from the support surface 31*m* in plan view, at lower portions of four corners of the support surface 31*m*. The protruding portions 31*n* are fixed to lifting mechanisms 39 to be described later, and the table 31 moves up and down with respect to the base members 15 as a result of the lifting mechanisms 39 moving the protruding portions 31*n* up and down.

The fall prevention plate 34 is a plate member that is vertically erected in contact with the left side, the right side, and the rear side of the support surface 31*m*. The fall prevention plate 34 prevents the medium M from falling from the support surface 31*m*. For example, when the medium M that is significantly smaller than the support surface 31*m*, or the medium M that has an unstable shape is used in the recording device 1, there is a possibility that the medium M may move on the support surface 31*m* when the support surface 31*m* moves up and down. In such a case, falling of the medium M can be effectively inhibited by the fall prevention plate 34.

The fall prevention plate 34 is fixed to the base members 15 and does not move regardless of the raising and lowering of the support surface 31*m*. The fall prevention plate 34 extends over a range from a lowest position to a highest position of the support surface 31*m* in a height direction. At least a part of the fall prevention plate 34 is positioned higher than the support surface 31*m* when the support surface 31*m* is at the lowest position.

The height movement mechanism 32 moves the table 31 up and down. As a result of the table 31 moving up and down, the support surface 31*m* and the medium M supported on the support surface 31*m* move up and down. The height movement mechanism 32 includes a lifting motor 33, a lifting belt 37, and the lifting mechanisms 39. The lifting mechanism 39 includes a ball screw disposed along the vertical direction, a nut screwed onto the ball screw, and a pulley. The ball screw of the lifting mechanism 39 is rotatably supported by the base member 15. The nut of the lifting mechanism 39 is fixed to the protruding portion 31*n* of the table 31. The pulley of the lifting mechanism 39 is fixed to an upper portion of the ball screw. When the pulley of the lifting mechanism 39 rotates, the ball screw rotates, and the protruding portion 31*n* moves along the vertical direction together with the nut, in accordance with the rotation of the ball screw.

The lifting motor 33 is a motor that rotates under the control of the control unit 90. The control unit 90 controls a rotation direction and rotation amount of the lifting motor 33. The lifting belt 37 is an annular belt wound around an output shaft of the lifting motor 33 and the pulleys of the four lifting mechanisms 39. The lifting belt 37 is driven to circulate by the rotation of the lifting motor 33. The lifting belt 37 transmits the rotation of the lifting motor 33 to the pulleys of the four lifting mechanisms 39. In this way, the ball screws of the lifting mechanisms 39 rotate to move the table 31 along the vertical direction.

The rotation direction of the lifting motor 33 can be switched between a forward direction in which the table 31 is moved upward and a reverse direction in which the table 31 is moved downward. The recording device 1 raises and lowers the table 31 by operating the lifting motor 33.

The height movement mechanism 32 can raise and lower the medium support unit 30, under the control of the control unit 90, in a state in which the medium M or the jig is installed on the medium support unit 30, for example.

The driving mechanism 50 includes the pair of guide shafts 51 and a frame driving unit 60. The guide shaft 51 is a shaft-like member extending over the pair of base members 15 and disposed along the front-rear direction.

The frame driving unit 60 is provided with a frame moving motor 61, a transmission belt 63, a speed change mechanism 65, and a transmission belt 67. The frame moving motor 61 is a motor that rotates under the control of the control unit 90. The transmission belt 63 is an annular belt stretched between an output shaft of the frame moving motor 61 and the speed change mechanism 65, and transmits a driving force of the frame moving motor 61 to the speed change mechanism 65. The speed change mechanism 65 includes a first pulley and a second pulley. The transmission belt 63 is wound around the first pulley, and the transmission belt 67 is wound around the second pulley. The speed change mechanism 65 drives the transmission belt 67 by rotating the second pulley using the driving force transmitted from the transmission belt 63 to the first pulley. The speed change mechanism 65 transmits the driving force of the frame moving motor 61 to the transmission belt 67 at a deceleration ratio corresponding to a ratio between the diameters of the first pulley and the second pulley.

The transmission belt 67 is an annular belt wound around the speed change mechanism 65 and a frame moving pulley 17 disposed at an end portion to the rear of the base member 15. The frame moving pulley 17 is a pulley that is installed so as to freely rotate with respect to the base member 15. The transmission belt 67 is disposed along the guide shaft 51.

The moving unit 70 is provided with a main frame 71, a pair of legs 73, and a carriage 89. The main frame 71 is a plate member that is long in the left-right direction. The pair of legs 73 are fitted to the pair of guide shafts 51, and are movable along the guide shafts 51. The main frame 71 is fixed to the top of the pair of legs 73, and is supported by the pair of legs 73 from below. The main frame 71 moves together with the pair of legs 73 in the front-rear direction while being guided by the pair of guide shafts 51.

Of the pair of legs 73, the leg 73 supporting the left end of the main frame 71 is fixed to the transmission belt 67 via a belt coupling portion 79. Thus, when the transmission belt 67 is driven to circulate, power for moving the leg 73 in the front-rear direction is applied to the leg 73. In this way, the moving unit 70 moves in the front-rear direction. Note that the lower end of the main frame 71 is positioned higher than the support surface 31*m* when the table 31 is positioned at an uppermost position. Thus, the main frame 71 moves in the front-rear direction above the support surface 31*m*, without interfering with the support surface 31*m*.

The rotation direction of the frame moving motor 61 can be switched between a forward direction that moves the main frame 71 in the forward direction, and a reverse direction that moves the main frame 71 in the rearward direction. The recording device 1 moves the main frame 71 forward and rearward by operating the frame moving motor 61.

The carriage 89 is a substantially cuboid box, and is supported by the main frame 71 via a carriage guide shaft 83. The carriage guide shaft 83 is a shaft-like member fixed to the main frame 71 and extends in the left-right direction along the main frame 71. The carriage guide shaft 83 supports the carriage 89 so that the carriage 89 is movable in the left-right direction. Note that the lower end of the carriage 89 is positioned higher than the support surface 31*m* when the table 31 is positioned at the uppermost position. Thus, the carriage 89 moves above the support surface 31*m* in the front-rear direction and the left-right direction, without interfering with the support surface 31*m*.

Further, the carriage 89 is coupled to a carriage driving belt 85. The carriage driving belt 85 is an annular belt disposed along the carriage guide shaft 83 by having one end wound around a carriage driving pulley 86 and the other end wound around an output shaft of a carriage driving motor 87. The carriage driving pulley 86 is a pulley that is rotatably fixed to the right end of the main frame 71. The carriage driving motor 87 is a motor that is fixed to the left end of the main frame 71 and rotates the output shaft thereof under the control of the control unit 90. The carriage driving motor 87 rotates the output shaft to drive the carriage driving belt 85 to circulate. In this way, the carriage driving motor 87 moves the carriage 89 coupled to the carriage driving belt 85 in the left-right direction along the carriage guide shaft 83.

The carriage 89 is provided with the recording head 89*a* and the irradiation unit 89*b*. The recording head 89*a* includes a plurality of nozzles (not illustrated) that open downward from the lower end surface of the carriage 89. The recording head 89*a* ejects the liquid from these nozzles by driving piezoelectric actuators (not illustrated). When the recording head 89*a* ejects the liquid from the nozzles, the ejected liquid flies between the nozzles and the medium M placed on the table 31 and lands on the medium M. Note that in the embodiment, the liquid ejected from the nozzles by the recording head 89*a* is an ink cured by ultraviolet rays. The recording head 89*a* records characters and images formed by the liquid on the medium M, by causing the liquid to land on the medium M on the medium support unit 30. The recording head 89*a* corresponds to an example of a "recording unit".

The irradiation unit 89*b* is provided with an irradiation window (not illustrated) facing downward from the lower end surface of the carriage 89. The irradiation window is constituted by a plate made of a light-transmissive material. The irradiation unit 89*b* emits irradiation light from a light-source unit (not illustrated) through the irradiation window. The irradiation light emitted from the irradiation unit 89*b* passes between the irradiation window and the medium M placed on the table 31, and is irradiated onto the medium M on which the recording has been performed by the recording head 89*a*. In the embodiment, the irradiation unit 89*b* is provided with an ultraviolet light emitting diode (UV-LED) that emits ultraviolet rays, and the irradiation light is the ultraviolet rays. In other words, in the embodiment, the irradiation unit 89*b* irradiates the ultraviolet rays onto the ink that has landed on the medium M and that is cured by the ultraviolet rays, and thus fixes the ink to the medium M.

2. Configuration of Pedestal Unit

As illustrated in FIG. 2 and FIG. 3, a pedestal unit 102 is disposed at the front portion of the recording device 1. The pedestal unit 102 is a box-shaped hollow structure. A plate-shaped setter 19 is disposed on the upper surface of the pedestal unit 102.

Components of the recording device 1 can be accommodated in the internal space of the pedestal unit 102. Further, auxiliary members used for maintenance of the recording device 1 or attached to the recording device 1 may also be accommodated in the pedestal unit 102. An example of a component of the recording device 1 is the deodorizing unit 20 that removes n offensive odor of the ink in the recording device 1. Further, an example of the members used for the maintenance of the recording device 1 include a cleaning tool used for cleaning the recording device 1.

In the embodiment, an example is illustrated in which the deodorizing unit 20 is installed in the pedestal unit 102. For example, as illustrated in FIG. 2 and FIG. 3, two of the deodorizing units 20 are accommodated in the pedestal unit 102. The two deodorizing units 20 are arranged side by side in the left-right direction. Two ventilation holes 19*a* for performing ventilation between the inside and the outside of the pedestal unit 102 are open in the setter 19. The ventilation holes 19*a* and 19*a* are provided at positions corresponding to the deodorizing units 20 disposed inside the pedestal unit 102.

3. Configuration of Deodorizing Unit

Figure 4:
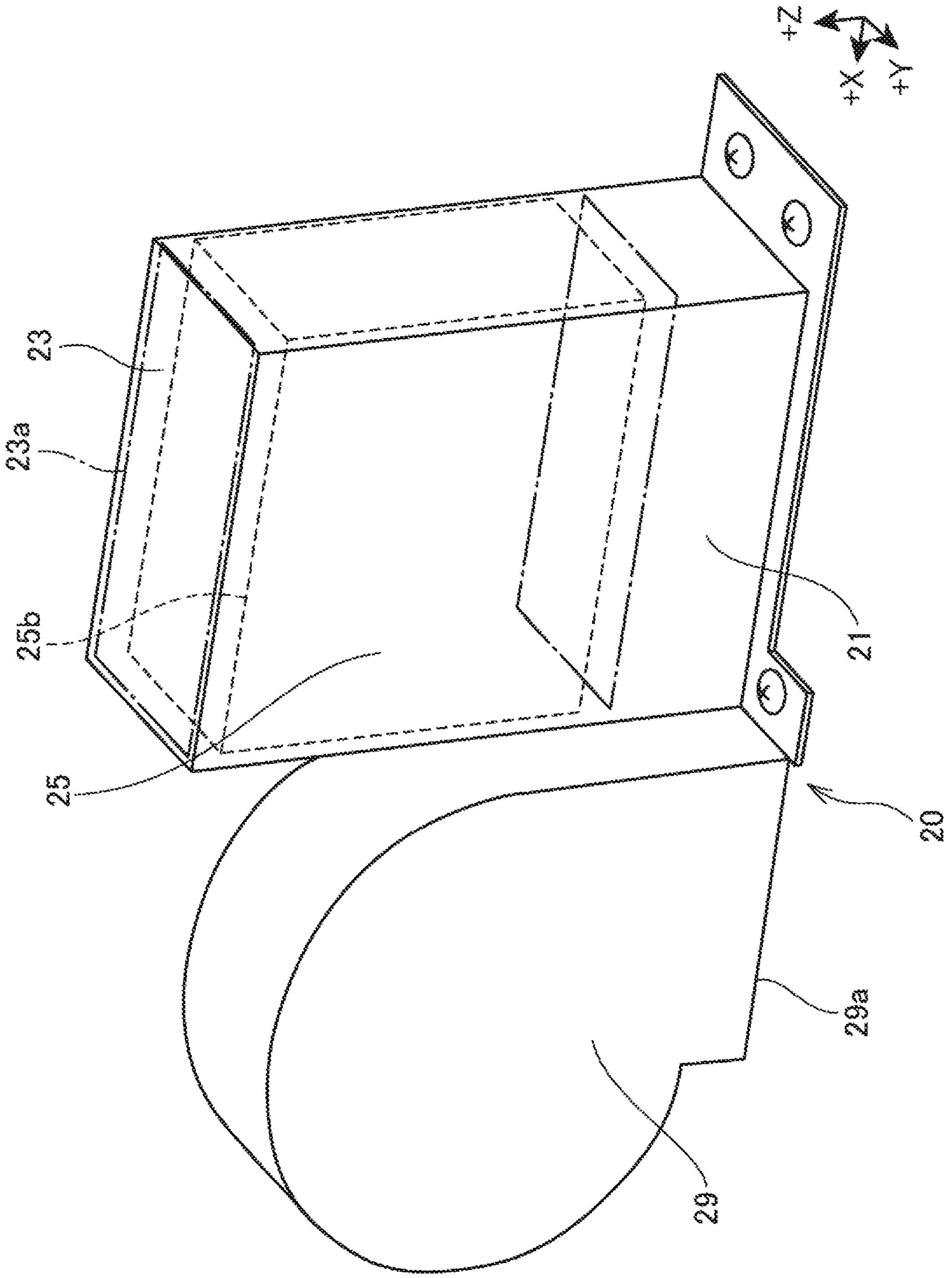
FIG. 4 is a perspective view of a deodorizing unit.

FIG. 4 is a perspective view of the deodorizing unit 20.

The deodorizing unit 20 is provided with a hollow deodorizing duct 21. The upper end of the deodorizing duct 21 is open, and this opening is called an intake port 23. The intake port 23 is positioned immediately below the ventilation hole 19*a* in a state in which the deodorizing unit 20 is mounted in the recording device 1.

The deodorizing unit 20 includes a blower 29. The blower 29 has a built-in blower fan (not illustrated), sucks in air through the deodorizing duct 21 by the operation of the blower fan, and discharges the air from a discharge port 29*a*. The blower 29 corresponds to an example of an "air intake device".

The lower portion of the deodorizing duct 21 is coupled to the blower 29. Further, a main body 25 of the deodorizing duct 21 forms a cuboid space, and a deodorizing member 25*b* is disposed in this space. The deodorizing member 25*b* is constituted, for example, by enclosing a large number of fine pellets containing active carbon in a bag-like net having a mesh finer than the pellets. The deodorizing member 25*b* is installed almost entirely in the internal space of the main body 25.

Further, a first filter 23*a* is disposed in the intake port 23. The first filter 23*a* removes foreign matter in the air sucked from the intake port 23 and flowing into the deodorizing member 25*b*.

The air flowing into the main body 25 by the operation of the blower 29 passes through gaps between the pellets of the deodorizing member 25*b*. Here, offensive odor components are adsorbed by the active carbon contained in the pellets of the deodorizing member 25*b*. Thus, the air sucked from the ventilation holes 19*a* and 19*a* is deodorized and discharged from the discharge port 29*a*.

Since the deodorizing member 25*b* is a consumable item whose performance decreases with use, the deodorizing member 25*b* needs to be replaced periodically. The deodorizing member 25*b* is attachable to and removable from the deodorizing unit 20. The user who operates the recording device 1 can replace the deodorizing member 25*b* by opening the upper surface of the pedestal unit 102 to expose the first filter 23*a*, and removing the first filter 23*a* to expose the deodorizing member 25*b*.

The deodorizing duct 21 is made of a metal plate, for example. Since the upper end of the deodorizing duct 21 is in contact with the lower surface of the setter 19, the deodorizing duct 21 can be expected to function to support the setter 19 from below.

4. Utilization of Work Surface

Figure 5:
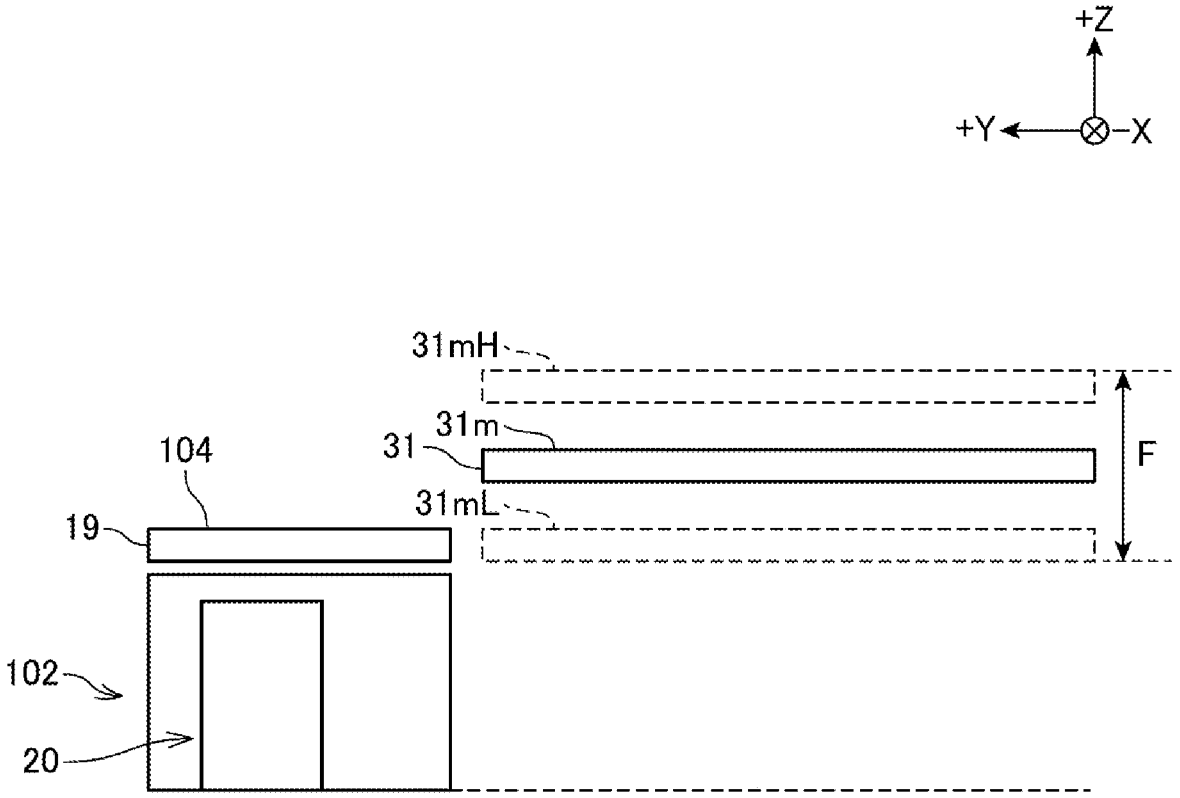
FIG. 5 is an explanatory view of a relative position between a support surface and a work surface.

FIG. 5 is an explanatory diagram of a relative position between the support surface 31*m* and a work surface 104.

The work surface 104 is the upper surface of the setter 19. The work surface 104 is positioned to the front of the support surface 31*m* when viewed from the front of the recording device 1. For this reason, the work surface 104 can be used as a temporary placement location where the medium M is temporarily placed when setting the medium M on the support surface 31*m*. Further, for example, when the jig is used as described below, the work surface 104 can be used as a temporary placement location where the jig is temporarily placed during an operation of installing the jig on the support surface 31*m*.

The work surface 104 is a flat surface that is substantially horizontal in the installed state of the recording device 1. For this reason, there is little concern that the jig or the medium M will roll and fall off, and it is suitable as the temporary placement location where the jig or the medium M is temporarily placed.

The operation of setting the jig and the medium M in the recording device 1 is performed in a state in which the cover 11 is open, as described above. Since the work surface 104 is exposed when the cover 11 is open, the work surface 104 is particularly suitable as the surface on which the jig or the medium M is temporarily placed.

In FIG. 5, a lifting range of the support surface 31*m* is indicated by a reference sign F. The lifting range F is a range over which the height of the support surface 31*m* changes in accordance with the lifting of the table 31. The position of the work surface 104 in the height direction corresponds to a state in which the support surface 31*m* is positioned at a lowermost section of the lifting range F. Specifically, when the support surface 31*m* is positioned at the lowest position in the lifting range F, the support surface 31*m* and the upper surface of the work surface 104 are in the same plane as each other. Thus, an operation of moving the medium M or the jig temporarily placed on the work surface 104 to the support surface 31*m* can be performed extremely easily.

Further, the distance between the work surface 104 and the support surface 31*m* in the direction along the Y-axis is preferably short. In this case, the operation of moving the medium M or the jig temporarily placed on the work surface 104 to the support surface 31*m* becomes even easier. For example, the work surface 104 and the support surface 31*m* may be substantially in contact with each other. Further, there is an advantage that there is little concern that the medium M or the like will fall into a gap between the work surface 104 and the support surface 31*m*.

The width of the work surface 104 in the left-right direction is preferably equal to or greater than the width of the support surface 31*m* in the left-right direction. In the embodiment, these widths are formed to be equal. Accordingly, the operation of moving the medium M or the jig temporarily placed on the work surface 104 to the support surface 31*m* becomes even easier.

5. Support Structure of Setter

The setter 19 is installed so as to be openable and closable with respect to the pedestal unit 102, and is configured so that the inside of the pedestal unit 102 is exposed when the setter 19 is lifted up. The setter 19 corresponds to an example of a "lid".

In the recording device 1, wall members 108 are positioned to the sides of the pedestal unit 102. The wall members 108 are plate members constituting a casing for accommodating an ink tank and the like in the recording device 1. Although various methods can be adopted as a support structure of the setter 19, a structure in which the setter 19 is rotatably attached to the wall members 108 is illustrated as an example in the embodiment.

Figure 6:
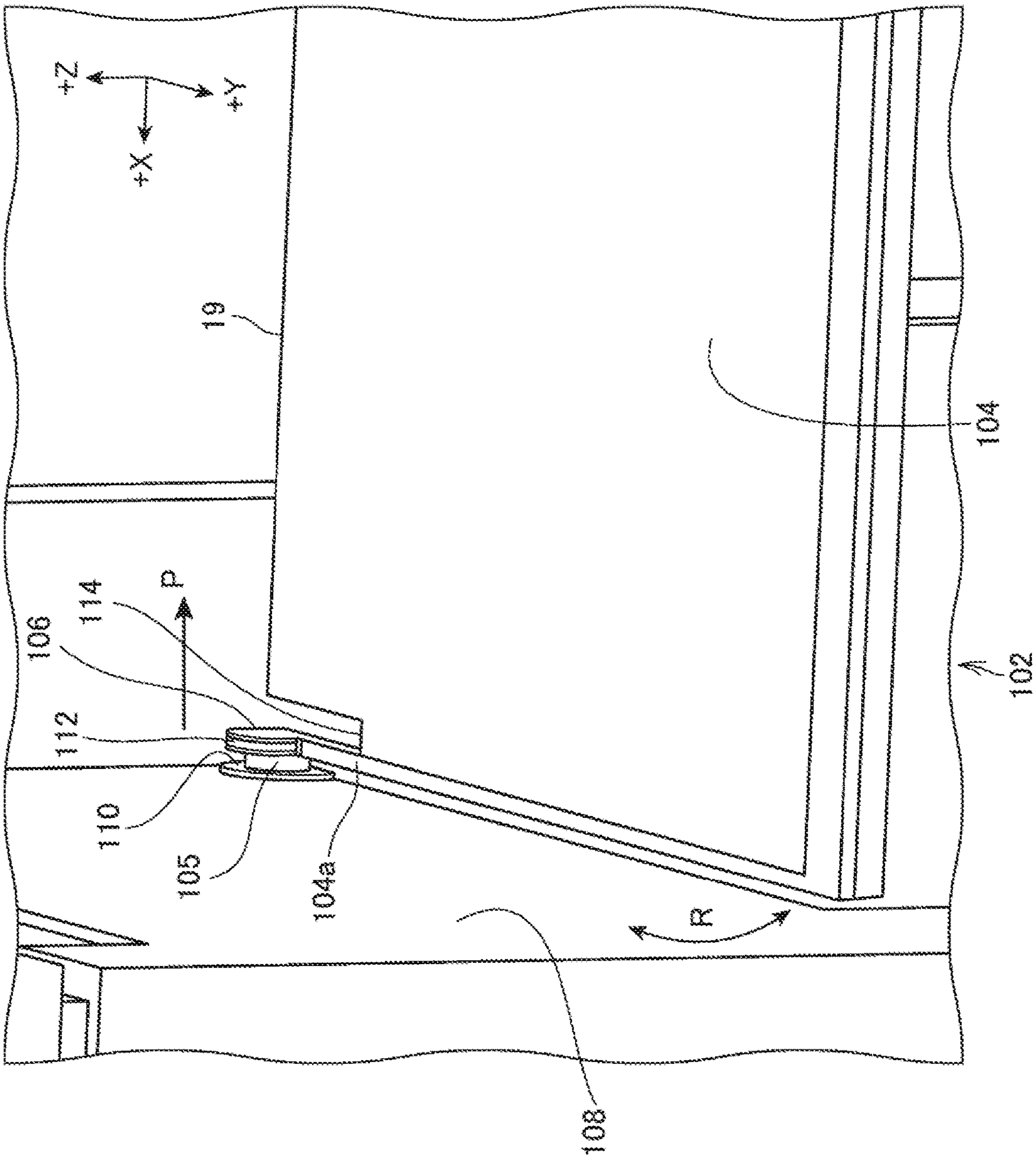
FIG. 6 is an enlarged perspective view illustrating main components of a setter.

FIG. 6 is an enlarged perspective view illustrating main components of the setter 19.

The setter 19 is supported by the wall members 108 at both left and right ends of the setter 19. FIG. 6 is an enlarged view of the end portion of the setter 19 on the +X side. The end of the setter 19 on the −X side is configured in a similar manner.

A hook 106 is provided at the end portion of the setter 19. The hook 106 includes a claw 112 provided upright at the end portion of the setter 19 and a columnar protrusion 105 protruding from the claw 112 in a direction along the X-axis. At the end portion of the setter 19, a groove 114 is cut out at the base of the claw 112. Therefore, the claw 112 is connected to the setter 19 via a long thin arm portion 104*a*. Since the setter 19 is made of a synthetic resin or metal, the arm 104*a* is elastically deformable. As a result of the groove 114 being cut out, the arm 104*a* can be elastically deformed more easily.

The columnar protrusion 105 is fitted into a recess 110 formed in the wall member 108. Since the recess 110 has a circular cross section, the columnar protrusion 105 is supported so as to be rotatable and such that the columnar protrusion 105 does not move in the direction along the Y-axis and the direction along the Z-axis. As a result, the setter 19 is supported by the wall members 108 so as to be rotatable, as indicated by a reference sign R in the drawing.

When the claw 112 is moved in a direction toward the center of the setter 19 along the X-axis, that is, in a direction P in the drawing, the columnar protrusion 105 is disengaged from the recess 110. In this way, the setter 19 can be removed from the wall member 108. Since the arm 104*a* is easily elastically deformable, it is easy to displace the claw 112 in the direction P. Therefore, the user can remove the setter 19 from the recording device 1 by operating the claw 112. Further, as described above, by rotating the setter 19 as indicated by R, it is also possible to expose the deodorizing portion 20 accommodated in the pedestal unit 102.

The shapes and sizes of the claw 112, the groove 114, and the arm 104*a* can be appropriately changed according to the material of the hook 106. For example, if the arm 104*a* is configured by a material that is highly flexible, the groove 114 may be smaller.

6. Configuration of Jig

Figure 7:
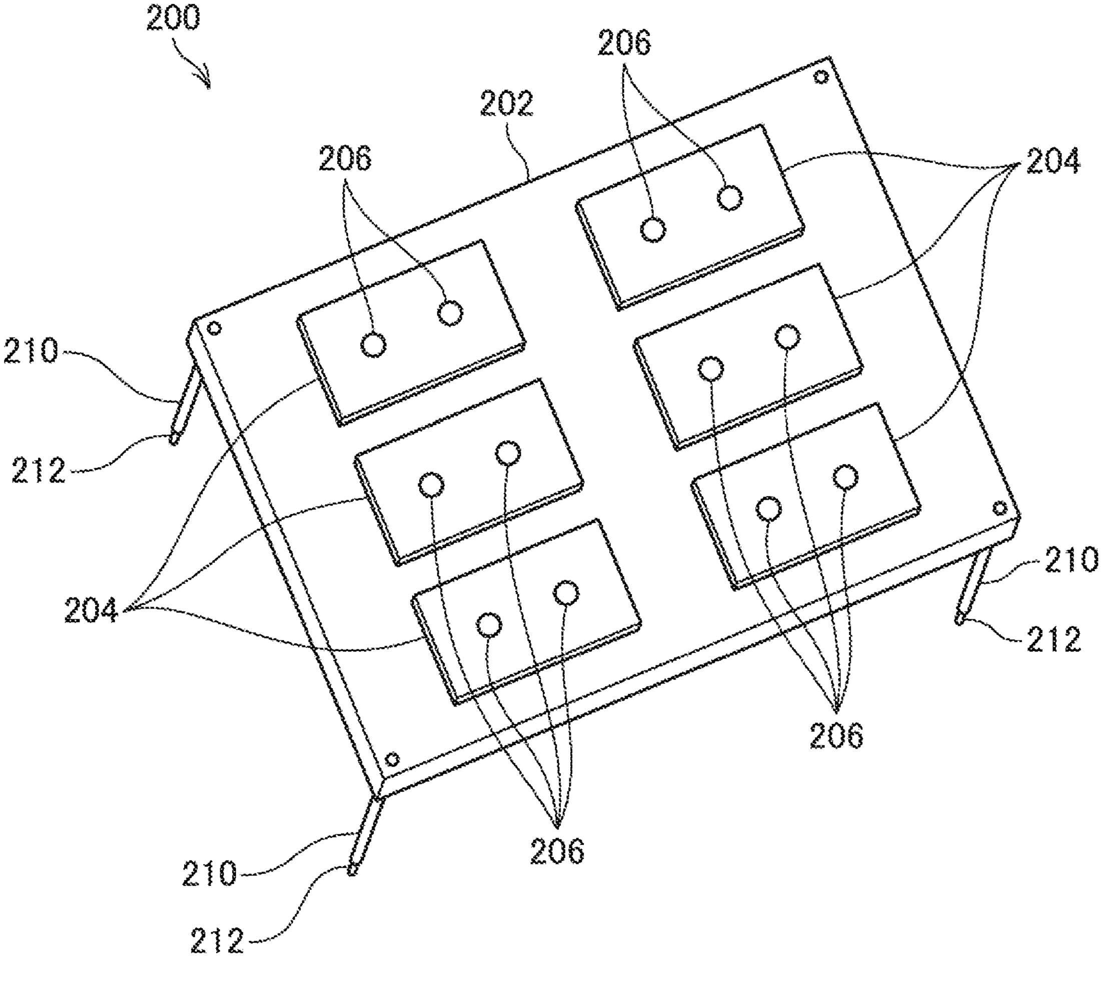
FIG. 7 is a perspective view illustrating an example of a jig.

FIG. 7 is a perspective view illustrating an example of a jig 200 used in the recording device 1.

For example, when a smartphone case is used as the medium M, the jig 200 illustrated in FIG. 7 is used to hold the medium M on the support surface 31*m*.

The jig 200 includes a jig pedestal 202, which is a substantially rectangular flat plate. Six jig units 204 are attached to the jig pedestal 202. The jig unit 204 has a shape to which a smartphone case can be attached. By mounting the smartphone case as the medium M on the jig unit 204 and installing the smartphone case together with the jig 200 on the medium support unit 30, it is possible to perform printing on the smartphone case using the recording device 1. The smartphone case is a three-dimensional object and may have a complex shape. However, by using the jig 200, the smartphone case can be held in a stable manner while the printing is performed by the recording device 1.

Legs 210 are attached to each of the four corners of the jig pedestal 202. A coupling portion 212 is formed at the tip of the leg 210.

For example, as illustrated in FIG. 3, a leg hole 201 into which the coupling portion 212 can be inserted is formed in the medium support unit 30. In this case, the jig 200 is coupled to and supported by the medium support unit 30 by inserting the coupling portions 212 of the legs 210 into each of the leg holes 201.

It is preferable that the jig supporting the medium M be as large as possible within a range over which the recording device 1 can perform the printing. For example, the jig 200 illustrated in FIG. 7 can collectively mount and hold a plurality of smartphone cases. When the jig 200 is used, it is possible to perform the printing on a large number of smartphone cases in a short time, which is efficient. Further, in order to stabilize the medium M, the jig that supports the medium M is required to have high rigidity, and is thus formed of a synthetic resin or metal having high rigidity. Thus, the jig used in the recording device 1 tends to be large in size and heavy. A load of an operation of installing such a jig on the medium support unit 30 is not light.

However, the recording device 1 includes the work surface 104 on which the medium M or the jig can be temporarily placed, to the front of the support surface 31*m* of the medium support unit 30. In the operation of installing the medium M or the jig on the medium support unit 30, the user can more easily perform the operation by using the work surface 104. For example, it is possible to first install the heavy jig on the work surface 104, and then install the jig on the medium support unit 30 after the user adjusts his/her posture. Further, by placing the jig on the work surface 104 in advance, the distance over which the jig is carried at one time can be shortened. Further, it is also possible to perform an operation of mounting the medium M on the jig after temporarily placing the medium M on the work surface 104 and installing the jig on the medium support unit 30.

The work surface 104 is exposed when the cover 11 is open, and thus can always be used when installing the medium M or the jig on the medium support unit 30. Further, since the work surface 104 is not exposed to the outside of the recording device 1 when the cover 11 is closed, there is no concern that an unnecessary object may be placed on the work surface 104, and little concern that the work surface 104 may be contaminated or damaged.

7. Effects

As described above, the recording device 1 according to the embodiment is provided with the medium support unit 30 that supports the medium M, the recording head 89*a* that performs the recording on the medium M supported by the medium support unit 30, and the housing 10 that accommodates the medium support unit 30 and the recording head 89*a*. The housing 10 includes the openable and closable cover 11 that opens the front surface 10*a* of the housing 10, and the work surface 104 is provided between the front surface 10*a* and the medium support unit 30. The medium support unit 30 and the work surface 104 are exposed when the cover 11 is open. Thus, the user can easily perform operations by using the work surface 104, in the operation of installing the medium M or the jig 200 on the medium support unit 30. In this way, an operating load on the user can be reduced, and workability can be improved.

The medium support unit 30 includes the support surface 31*m* that can support the medium M, and the jig 200 to which the medium M is mounted. In a front view, the width of the work surface 104 is the same as the width of the support surface 31*m* or is greater than the width of the support surface 31*m*. For this reason, when the medium M or the jig 200 are installed on the support surface 31*m*, it is possible to temporarily place the medium M or the jig 200 on the work surface 104, and workability can be further improved. Further, the operation to install the medium M or the jig 200 placed on the work surface 104 on the support surface 31*m* is easy, and the workability can be even further improved.

The recording device 1 is provided with the height movement mechanism 32 that moves the medium support unit 30 in the height direction, and the work surface 104 located higher than the support surface 31*m* when the medium support unit 30 is at its lowest position. Thus, in the recording device 1 in which the height of the medium support unit 30 can be changed in accordance with the size and shape of the medium M or the jig 200, the height of the work surface 104 does not become higher than the support surface 31*m*. Therefore, when moving the medium M or the jig 200 placed on the work surface 104 to the support surface 31*m*, a difference in height between the support surface 31*m* and the work surface 104 does not become an obstacle. Thus, it is possible to even further improve the workability of the operation relating to the setting or replacement of the medium M.

The height movement mechanism 32 can move the medium support unit 30 in a state in which at least one of the medium M and the jig 200 is supported on the support surface 31*m*. Thus, after the medium M or the jig 200 is installed on the support surface 31*m*, the medium support unit 30 can be raised and lowered. In this way, it is possible to improve the workability of the operation relating to the setting or replacement of the medium M or the jig 200. For example, in the operation of setting the medium M or the jig 200 on the medium support unit 30, the height of the medium support unit 30 can be lowered to improve the workability, and subsequently, the medium support unit 30 can be raised before the printing is performed.

The recording device 1 is provided with the hollow pedestal unit 102 including the openable and closable setter 19, and the work surface 104 is the upper surface of the setter 19. For this reason, it is possible to accommodate the configuration of the recording device 1 and other commodities inside the pedestal unit 102 that constitutes the work surface 104. Accordingly, it is not necessary to newly secure a space for providing the work surface 104. Thus, the work surface 104 can be provided without increasing the size of the recording device.

The recording device 1 is provided with the deodorizing unit 20, and the pedestal unit 102 accommodates the deodorizing unit 20. For this reason, it is possible to dispose the deodorizing unit 20, which removes the offensive odor of the ink, in the interior of the pedestal unit 102. Thus, it is possible to reduce the size of the recording device 1 capable of reducing discomfort for the user due to the deodorizing function.

The deodorizing member 25*b* is attachable to and detachable from the deodorizing unit 20, and the deodorizing member 25*b* is exposed when the setter 19 of the pedestal unit 102 is open. Therefore, the deodorizing member 25*b* can be easily replaced by opening the setter 19.

The work surface 104 may be a flat plate member that is attachable to and detachable from the setter 19 of the pedestal unit 102. For example, the flat plate member that can be used as the work surface 104 may be provided so as to be overlaid on the setter 19. Since the flat plate member serving as the work surface 104 is supported by the upper surface of the setter 19, the flat plate member need not necessarily have the rigidity to withstand the load of the medium M or the jig 200, and may be, for example, a flexible sheet. This type of flat plate member may be a resin material including a plurality of convex portions to inhibit slipping, for example. Further, a boss or a protruding portion for positioning the medium M or the jig 200 may be provided on this type of flat plate member. Further, this type of flat plate member may be configured to be able to be removed from the setter 19 and replaced in accordance with a purpose of use by the user or in accordance with wear. In this case, since the work surface 104 can be replaced when the work surface 104 is worn or in accordance with the purpose of use, the work surface 104 can be provided with various functions.

The setter 19 is attachable to and detachable from the main body of the recording device 1, that is, the housing 10. Thus, the setter 19 can be replaced when the setter 19 is worn or in accordance with the purpose of use. Further, when the setter 19 is detached, the inside of the pedestal unit 102 is exposed. Thus, the setter 19 can be provided with various functions.

8. Other Embodiments

Note that the above embodiment simply describes a specific example to which the present disclosure is applied. The present disclosure is not limited to the configurations in the embodiment described above, and can be implemented in various aspects without departing from the scope and gist of the disclosure.

For example, in the above-described embodiment, the ventilation holes 19*a* are provided in the setter 19 and the work surface 104. However, when the pedestal unit 102 is not provided with the deodorizing unit 20, it is not necessary to form the ventilation holes 19*a*.

Further, in the above-described embodiment, the pedestal unit 102 may be configured to be detachable from the recording device 1. In this configuration, the setter 19 may be attached to a main body of the pedestal unit 102 instead of the wall members 108. According to this configuration, the pedestal unit 102 can be removed from the recording device 1, and it is possible to replace the pedestal unit 102 and not just the setter 19 alone.

In the above-described embodiment, the setter 19 may be rotatably attached in a state in which the setter 19 cannot be detached from the recording device 1, and the work surface 104 mounted on the upper surface of the setter 19 may be configured to be replaceable.

Further, the recording method of the recording device 1 is not limited to the ink jet method, and may be a thermal sublimation method, or another method may be adopted. Further, the recording device 1 may be a so-called 3D printer, and may be configured to eject a thermoplastic resin as the ink, and to form a three-dimensional object as the medium M using the ink itself.

9. Configurations Described by Embodiment

According to the above-described embodiment, the following configurations are described.

Configuration 1

A recording device includes a medium support unit configured to support a medium, a recording unit configured to perform recording on the medium supported by the medium support unit, and a housing configured to accommodate the medium support unit and the recording unit. The housing includes a cover being openable and closable and configured to open a first surface of the housing. A work surface is provided between the first surface and the medium support unit, and the medium support unit and the work surface are exposed when the cover is open.

According to the recording device according to Configuration 1, in an operation of installing the medium or the like on the medium support unit, a user can easily perform the operation by using the work surface. Thus, an operating load on the user can be reduced, and workability can be improved.

Configuration 2

In the recording device according to Configuration 1, the medium support unit includes a support surface configured to support the medium, and a jig to which the medium is attached. In a front view of viewing the work surface and the support surface from the first surface, a width of the work surface is equal to or greater than a width of the support surface.

According to the recording device according to Configuration 2, when installing the medium or the like on the support surface, the medium or the like can be temporarily placed on the work surface, and the workability can be further improved. Further, an operation of installing the medium or the like placed on the work surface on the support surface is also easy, and the workability can be even further improved.

Configuration 3

The recording device according to Configuration 1 or Configuration 2 includes a movement mechanism configured to move the medium support unit in a height direction according to an installation state of the recording device. The work surface is located higher than the support surface when the medium support unit is at a lowest position.

According to the recording device according to Configuration 3, in the recording device in which the height of the medium support unit can be changed in accordance with a size and shape of the medium or a jig, the height of the work surface does not become higher than the support surface. Thus, when moving the medium or the like placed on the work surface to the support surface, a difference in height between the support surface and the work surface does not become an obstacle. The workability of the operation relating to the setting or replacement of the medium can thus be even further improved.

Configuration 4

The recording device according to Configuration 3 includes a control unit configured to control the movement mechanism. The movement mechanism is configured to move the medium support unit in a state where at least one of the medium or the jig is supported on the support surface.

According to the recording device according to Configuration 4, the medium support unit can be raised and lowered after the medium or the like is installed on the support surface. Accordingly, the workability of the operation relating to the setting or replacement of the medium or the like can be improved. For example, in the operation of setting the medium or the like on the medium support unit, the height of the medium support unit can be lowered to improve the workability, and subsequently the medium support unit can be raised before printing is performed.

Configuration 5

The recording device according to any one of Configurations 1 to 3 includes a pedestal unit being hollow and having a lid being openable and closable. The work surface is an upper surface of the lid.

According to the recording device according to Configuration 5, it is possible to accommodate the configuration of the recording device and other commodities inside the pedestal unit that constitutes the work surface. Accordingly, it is not necessary to newly secure a space for providing the work surface. Thus, the work surface can be provided without increasing the size of the recording device.

Configuration 6

The recording device according to any one of Configurations 1 to 4 includes a deodorizing unit including an air intake device configured to suck air into an interior of the pedestal unit, and a deodorizing member configured to deodorize the air sucked in by the air intake device. The pedestal unit accommodates the deodorizing unit.

According to the recording device according to Configuration 6, it is possible to dispose the deodorizing member inside the pedestal unit and remove the offensive odor of ink or the like used in the printing. Thus, it is possible to reduce the size of the recording device capable of reducing discomfort for the user due to the deodorizing function.

Configuration 7

In the recording device according to Configuration 6, the deodorizing member is configured to be attached to and detached from the deodorizing unit, and the deodorizing member is exposed when the lid of the pedestal unit is open.

According to the recording device according to Configuration 7, the deodorizing member can be easily replaced by opening the lid.

Configuration 8

In the recording device according to any one of Configurations 5 to 7, the work surface is a flat plate member configured to be attached to and detached from the lid of the pedestal unit.

According to the recording device according to Configuration 8, since the work surface can be replaced when the work surface is worn, or in accordance with a purpose of use of the work surface, the work surface can be provided with various functions.

Configuration 9

In the recording device according to any one of Configurations 5 to 7, the lid is configured to be attached to and detached from a main body of the recording device.

According to the recording device according to Configuration 9, the lid can be replaced when the lid is worn, or in accordance with the purpose of use.

What is claimed is:

1. A recording device comprising:
- a medium support unit configured to support a medium;
- a recording unit configured to perform recording on the medium supported by the medium support unit; and
- a housing defining an enclosed space configured to continuously accommodate the medium support unit and the recording unit, wherein
- the housing includes a cover being openable and closable and configured to open a first surface of the housing,
- a work surface is provided between the first surface and the medium support unit, and
- the medium support unit and the work surface are exposed when the cover is open.

2. The recording device according to claim 1, wherein
- the medium support unit includes a support surface configured to support the medium, and a jig to which the medium is attached, and
- in a front view of viewing the work surface and the support surface from the first surface, a width of the work surface is equal to or greater than a width of the support surface.

3. The recording device according to claim 2, comprising
- a movement mechanism configured to move the medium support unit in a height direction according to an installation state of the recording device, wherein
- the work surface is located higher than the support surface when the medium support unit is at a lowest position.

4. The recording device according to claim 3, comprising
- a control unit configured to control the movement mechanism, wherein
- the movement mechanism is configured to move the medium support unit in a state where at least one of the medium or the jig is supported on the support surface.

5. The recording device according to claim 3, comprising
- a pedestal unit being hollow and having a lid being openable and closable, wherein
- the work surface is an upper surface of the lid.

6. The recording device according to claim 5, comprising
- a deodorizing unit including an air intake device configured to suck air into an interior of the pedestal unit, and a deodorizing member configured to deodorize the air sucked in by the air intake device, wherein
- the pedestal unit is configured to accommodate the deodorizing unit.

7. The recording device according to claim 6, wherein
- the deodorizing member is configured to be attached to and detached from the deodorizing unit, and the deodorizing member is exposed when the lid of the pedestal unit is open.

8. The recording device according to claim 5, wherein the work surface is a flat plate member configured to be attached to and detached from the lid of the pedestal unit.

9. The recording device according to claim 5, wherein the lid is configured to be attached to and detached from a main body of the recording device.

10. A recording device comprising:

a medium support unit configured to support a medium;

a recording unit configured to perform recording on the medium supported by the medium support unit;

a housing configured to accommodate the medium support unit and the recording unit; and a pedestal unit being hollow and having a lid being openable and closable, wherein the housing includes a cover being openable and closable and configured to open a first surface of the housing, a work surface is provided between the first surface and the medium support unit, the medium support unit and the work surface are exposed when the cover is open, and the work surface is an upper surface of the lid.

11. The recording device according to claim 10, comprising a deodorizing unit including an air intake device configured to suck air into an interior of the pedestal unit, and a deodorizing member configured to deodorize the air sucked in by the air intake device, wherein the pedestal unit is configured to accommodate the deodorizing unit.

12. The recording device according to claim 11, wherein the deodorizing member is configured to be attached to and detached from the deodorizing unit, and the deodorizing member is exposed when the lid of the pedestal unit is open.

13. The recording device according to claim 10, wherein the work surface is a flat plate member configured to be attached to and detached from the lid of the pedestal unit.

14. The recording device according to claim 10, wherein the lid is configured to be attached to and detached from a main body of the recording device.

* * * * *